United States Patent
Nakagawa

(10) Patent No.: US 8,532,128 B2
(45) Date of Patent: Sep. 10, 2013

(54) RELAYING APPARATUS AND PACKET RELAYING METHOD

(75) Inventor: Yukihiro Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/337,809

(22) Filed: Dec. 18, 2008

(65) Prior Publication Data

US 2009/0262747 A1 Oct. 22, 2009

(30) Foreign Application Priority Data

Apr. 16, 2008 (JP) ................................ 2008-107176

(51) Int. Cl.
*H04L 12/28* (2006.01)

(52) U.S. Cl.
USPC .......................... 370/412; 370/389; 370/395.4

(58) Field of Classification Search
None
See application file for complete search history.

(56) References Cited

U.S. PATENT DOCUMENTS

| | | | |
|---|---|---|---|
| 6,680,945 B1 | 1/2004 | Merchant et al. | |
| 6,738,288 B2 | 5/2004 | Kawamura et al. | |
| 6,836,479 B1 | 12/2004 | Sakamoto et al. | |
| 6,944,182 B1 | 9/2005 | Amagai et al. | |
| 6,976,096 B1 | 12/2005 | Cherukuri et al. | |
| 7,136,351 B2 * | 11/2006 | Metin et al. | 370/230 |
| 7,245,617 B2 | 7/2007 | Nakagawa | |
| 7,349,417 B2 | 3/2008 | Nakagawa | |
| 7,522,525 B2 * | 4/2009 | Mieno et al. | 370/235 |
| 7,551,561 B2 * | 6/2009 | Sawabe | 370/235 |
| 7,633,889 B2 * | 12/2009 | Higashitaniguchi et al. | 370/256 |
| 2002/0031142 A1 * | 3/2002 | Metin et al. | 370/463 |
| 2002/0141445 A1 * | 10/2002 | Lee | 370/468 |
| 2002/0167950 A1 * | 11/2002 | Chang et al. | 370/396 |
| 2002/0181484 A1 | 12/2002 | Aimoto | |
| 2004/0001356 A1 | 1/2004 | Kawamura et al. | |
| 2004/0156359 A1 | 8/2004 | Nakagawa | |
| 2004/0156376 A1 | 8/2004 | Nakagawa | |
| 2004/0213152 A1 * | 10/2004 | Matuoka et al. | 370/230 |
| 2005/0163132 A1 * | 7/2005 | Mieno et al. | 370/395.53 |
| 2007/0268903 A1 | 11/2007 | Nakagawa | |
| 2008/0181245 A1 * | 7/2008 | Basso et al. | 370/412 |

FOREIGN PATENT DOCUMENTS

| | | |
|---|---|---|
| EP | 1 130 854 | 9/2001 |
| EP | 1 863 234 | 12/2007 |
| JP | 2000-232482 A | 8/2000 |
| JP | 2000-324130 A | 11/2000 |
| JP | 2004-30784 | 1/2004 |
| JP | 2004-30786 | 1/2004 |
| JP | 2004-242335 A | 8/2004 |
| JP | 2007-274529 | 10/2007 |
| WO | 2004/040854 | 5/2004 |
| WO | WO-2005/079016 A1 | 8/2005 |

OTHER PUBLICATIONS

European Search Report dated Jul. 24, 2009, from the corresponding European Application.
European official communication, mailed Sep. 16, 2010, in corresponding European Patent Application No. 08172062.5, English language.
Japanese Office Action mailed Feb. 21, 2012 for corresponding Japanese Application No. 2008-107176, with Partial English-language Translation.

* cited by examiner

*Primary Examiner* — Mark Rinehart
*Assistant Examiner* — Hicham Foud
(74) *Attorney, Agent, or Firm* — Fujitsu Patent Center

(57) ABSTRACT

A packet storing unit stores relay instructions for received packets in different queues depending on priority and a VLAN number. DRR schedulers take out relay instructions from respective queues through a DRR technique. A priority control transmission scheduler transmits the packets to another apparatus according to the relay instructions in a descending order of priority.

6 Claims, 13 Drawing Sheets

| VLAN NUMBER | MEMBER PORT NUMBER | QID | | | | | | | |
|---|---|---|---|---|---|---|---|---|---|
| | | PRIORITY 0 | PRIORITY 1 | PRIORITY 2 | PRIORITY 3 | PRIORITY 4 | PRIORITY 5 | PRIORITY 6 | PRIORITY 7 |
| 1 | 11a, 12a | 0 | 0 | 0 | 0 | 0 | 0 | 0 | 0 |
| 2 | 11b, 12b | 1 | 1 | 1 | 1 | 1 | 1 | 1 | 1 |
| 3 | 11c, 12c | 2 | 2 | 2 | 2 | 2 | 2 | 2 | 2 |
| 4 | 11a, 12a, 12b | 3 | 3 | 3 | 3 | 3 | 3 | 3 | 3 |
| 5 | 11a, 12a | 0 | 1 | 2 | 3 | 0 | 1 | 2 | 3 |
| ... | ... | ... | ... | ... | ... | ... | ... | ... | ... |
| 100 | 11b, 12b | 3 | 3 | 3 | 3 | 3 | 3 | 3 | 3 |
| ... | ... | ... | ... | ... | ... | ... | ... | ... | ... |

FIG.11

| VLAN NUMBER | PRIORITY 0 | PRIORITY 1 | PRIORITY 2 | PRIORITY 3 | PRIORITY 4 | PRIORITY 5 | PRIORITY 6 | PRIORITY 7 |
|---|---|---|---|---|---|---|---|---|
| 1 | 0 | 0 | 0 | 0 | 0 | 0 | 0 | 0 |
| 2 | - | - | - | - | - | - | - | - |
| 3 | - | - | - | - | 2 | 2 | 2 | 2 |
| 4 | 3 | 3 | 3 | 3 | 3 | 3 | 3 | 3 |
| 5 | 0 | 1 | 2 | 3 | 0 | 1 | 2 | 3 |
| ... | ... | ... | ... | ... | ... | ... | ... | ... |

QID 251

RELAYING APPARATUS AND PACKET RELAYING METHOD

CROSS-REFERENCE TO RELATED APPLICATION

This application is based upon and claims the benefit of priority of the prior Japanese Patent Application No. 2008-107176, filed on Apr. 16, 2008, the entire contents of which are incorporated herein by reference.

FIELD

The embodiments discussed herein are directed to a relaying apparatus and packet relaying method of relaying a packet received from an apparatus belonging to a predetermined virtual network to another apparatus.

BACKGROUND

In recent years, some relaying apparatuses, such as switches and routers, which relay a packet, come to have a function called Quality of Service (QoS) for ensuring communication quality. Examples of the function for ensuring communication quality include bandwidth control for achieving data transmission with a lowest bandwidth under contract with each user, priority control for relaying packets in descending order of priority set in each packet.

Meanwhile, Virtual Local Area Networks (VLANs) have become widely used in recent years. The VLAN is a virtual network created in a physical network. Communication providers and users of VLANs desire to realize congestion control for each virtual network.

To satisfy this need, several technologies achieving bandwidth control for each virtual network have been suggested. For example, according to one suggestion, a relaying apparatus is designed to realize bandwidth control for each virtual network by performing a packet relaying process for each VLAN number, which is assigned for identifying a virtual network (refer to International Publication No. 04/040854 pamphlet and Japanese Patent Application Laid-open No. 2007-274529).

However, the conventional relaying apparatus has a problem in that it cannot perform priority control on packets circulating over different virtual networks. Specifically, though the conventional relaying apparatus performs packet relaying control on packets with the same VLAN number based on their priority, the conventional relaying apparatus does not perform packet relaying control on packets with different VLAN numbers based on their priority. Therefore, when one packet has VLAN number "A" and priority "7", and another packet has VLAN number "B" and priority "0", the conventional relaying apparatus may relay the latter packet with priority "0" before relaying the former packet with priority "7". In this example, it is assumed that a larger number represents a higher priority.

SUMMARY

It is an object of the present invention to at least partially solve the problems in the conventional technology.

According to an aspect of an embodiment, a relaying apparatus includes a plurality of reception ports each receiving a packet from an apparatus belonging to a predetermined virtual network, a plurality of transmission ports each transmitting a packet to another apparatus, a plurality of queues provided for each of the transmission ports in association with a combination of a priority indicative of an order of precedence for packet relaying and a VLAN number for identifying a virtual network, a route storage unit that stores therein port numbers for identifying the transmission ports in association with destination information set in each packet, a queue-number storage unit that stores therein queue numbers for identifying the queues in association with the combination of the VLAN number and the priority, a route determining unit that determines that a packet received by one of the reception ports is to be output to a transmission port indicated by a port number stored in the route storage unit in association with destination information set in the packet, a packet storing unit that stores a packet in one of a plurality of queues corresponding to the transmission port determined by the route determining unit, the one of the queues being indicated by a queue number stored in the queue-number storage unit in association with a combination of a VLAN number and a priority set in the packet, and a packet transmitting unit that transmits the packet stored in the queue by the packet storing unit to the other apparatus based on the priority associated with the queue.

According to another aspect of an embodiment, a packet relaying method is for relaying a packet transmitted from an apparatus belonging to a predetermined virtual network to another apparatus via plural reception ports receiving a packet and plural transmission ports transmitting a packet, and the method includes firstly storing port numbers for identifying the transmission ports in association with destination information set in each packet, secondly storing queue numbers for identifying a plurality of queues provided for each of the transmission ports, in association with a combination of a priority indicative of an order of precedence for packet relaying and a VLAN number for identifying the virtual network, determining that a packet received by one of the reception ports is to be output to a transmission port indicated by a port number stored in the firstly storing in association with destination information set in the packet, thirdly storing the packet in one of a plurality of queues corresponding to the transmission port determined in the determining, the queue indicated by a queue number stored in the secondly storing in association with a combination of a VLAN number and a priority set in the packet, and transmitting the packet stored in the thirdly storing to the other apparatus based on the priority associated with the queue.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 5 is a drawing of an example of a queue-number storage unit;

FIG. 11 is a drawing of an example of a queue-number storage unit;

DESCRIPTION OF EMBODIMENTS

Embodiments of a relaying apparatus and packet relaying method according to the present invention are explained in detail below based on the drawings. In examples described below as the embodiments, the relaying apparatus and the packet relaying method are applied to a switch. Alternatively, the relaying apparatus and the packet relaying method can be applied to other relaying apparatuses, such as a router.

[a] First Embodiment

Figure 1:
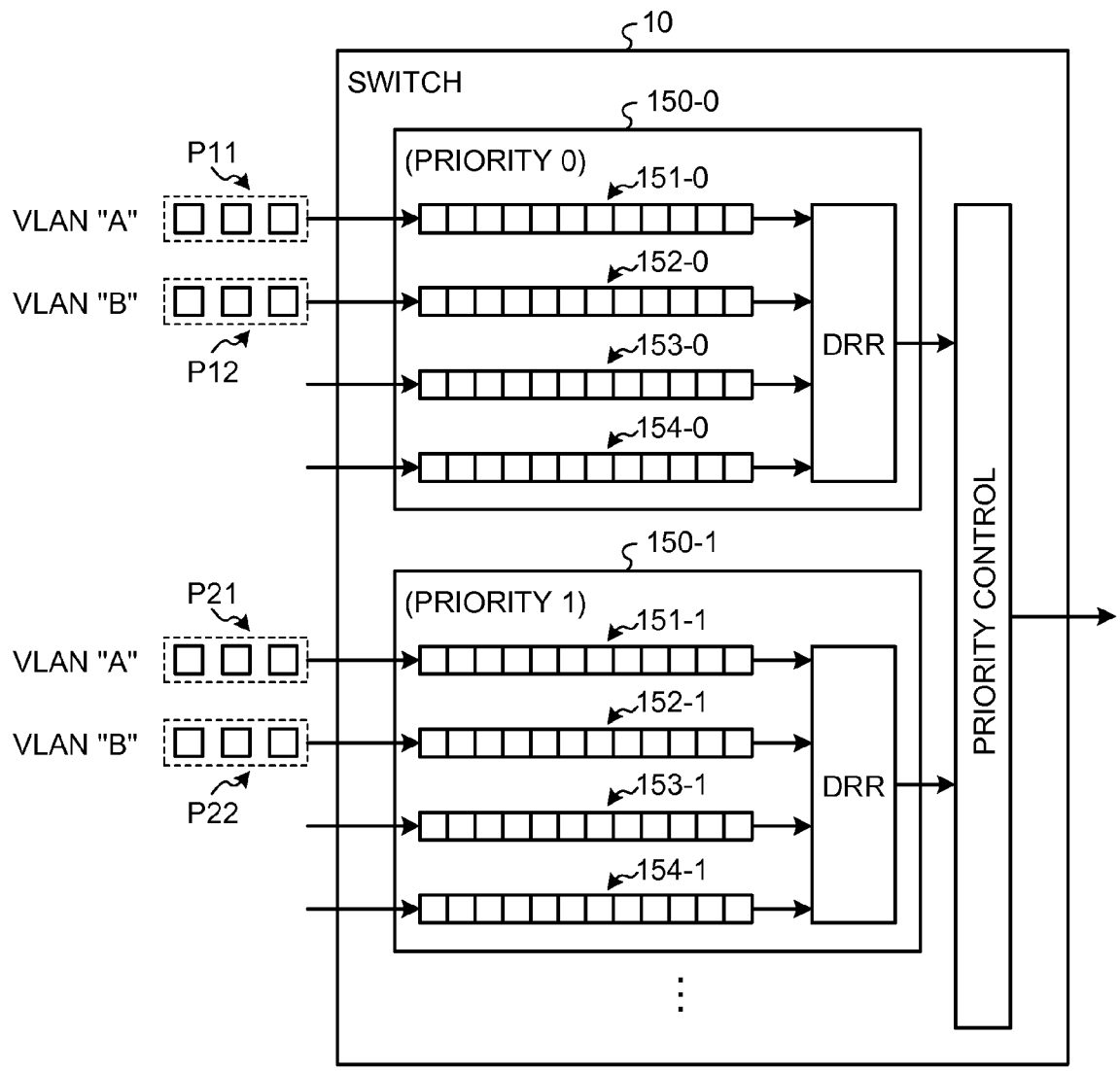
FIG. 1 is a drawing for explaining a general outline of a switch according to a first embodiment.

Firstly, a switch according to a first embodiment is schematically explained. FIG. 1 depicts an overview of the switch according to the first embodiment. As depicted in FIG. 1, a switch 10 according to the first embodiment includes queue groups 150-0, 150-1, and so on.

The switch 10 has a queue group like the queue group 150-0 corresponding to each priority of the packet. Assuming that the priority range set for received packets is from "0" to "7", eight queue groups 150-0 to 150-7 are arranged in the switch 10 of FIG. 1. In FIG. 1, the queue group 150-0 corresponds to the priority "0", whereas the queue group 150-1 corresponds to the priority "1".

Each of the queue groups 150-0 to 150-7 has a plurality of queues. In the example of FIG. 1, the queue group 150-0 has four queues 151-0 to 154-0, whereas the queue group 150-1 has four queues 151-1 to 154-1.

On receiving a packet, the switch 10 according to the first embodiment causes the packet to be stored in a predetermined storage unit (i.e., a stream memory 16, which will be explained later). The switch 10 stores an instruction for relaying a packet stored in the stream memory 16 to another apparatus (hereinafter, "relay instruction") in the queue 151-0, for example. For simplicity of description of FIG. 1, the received packet is assumed to be stored in the queue such as the queue 151-0 in FIG. 1.

On receiving a packet, the switch 10 of the above-described configuration determines a queue in which the received packet is to be stored based on a VLAN number, a priority set for the packet, and various information stored in a predetermined storage unit (i.e., a queue-number storage unit 173, which will be explained later). The queue determined by the switch 10 as a storage destination of the packet is hereinafter referred to as a "storage-destination queue".

In the example depicted in FIG. 1, a packet P11 has a VLAN number set as "A" and a priority set as "0". A packet P12 has a VLAN number set as "B" and a priority set as "0". A packet P21 has a VLAN number set as "A" and a priority set as "1". A packet P22 has a VLAN number set as "B" and a priority set as "1".

On receiving the packets P11, P12, P21, and P22, the switch 10 stores the packet P11 in the queue 151-0 in the queue group 150-0 corresponding to the priority "0". The switch 10 stores the packet P12 in the queue 152-0 in the queue group 150-0 corresponding to the priority "0". Furthermore, the switch 10 stores the packet P21 in the queue 151-1 in the queue group 150-1 corresponding to the priority "1". Still further, the switch 10 stores the packet P22 in the queue 152-1 in the queue group 150-1 corresponding to the priority "1".

Subsequently, the switch 10 takes out packets from the queues 151-0 to 154-0 of the queue group 150-0 through a Deficit Round Robin (DRR) technique. In a similar manner, the switch 10 takes out packets from the queues 151-1 to 154-1 of the queue group 150-1 through the DRR technique. The switch 10 then transmits the packets taken out from the respective queue groups to another apparatus (for example, an information processing apparatus, such as another switch or server) in a descending order of priority.

Thus, the switch 10 according to the first embodiment includes a plurality of queues each provided in association with a combination of a priority and a VLAN number; when receiving a packet, stores the packet in a different queue for each combination of the priority and the VLAN number set for that packet; and takes out a packet from each queue group through a DRR technique for transmission to another apparatus. Therefore, bandwidth control can be performed for each virtual network. Further, the user of the switch 10 (such as a network manager) can change a lowest bandwidth for each virtual network only by changing a rate of weight in the DRR technique. For example, in the example depicted in FIG. 1, if the user desires to make the bandwidth of the VLAN number "B" larger than that of the VLAN number "A", he/she can achieve this only by setting the rate of weight of the queue 152-0 larger than the rate of weight of the queue 151-0.

Further, because the switch 10 according to the first embodiment transmits the packet taken out from each queue group through the DRR technique to another apparatus in a descending order of priority, priority control can be performed taking priorities of all received packets into consideration.

Thus, the switch 10 according to the first embodiment can perform priority control taking priorities of all received packets into consideration, and also can perform bandwidth control for each virtual network.

In the above-described example, packets with different VLAN numbers are stored in different queues. Alternatively, packets with different VLAN numbers may be stored in the same queue. For example, the switch 10 may store packets having VLAN numbers "A" to "C" in the queue 151-0 and packets having VLAN numbers "D" to "F" in the queue 151-1.

Then, several virtual networks can be handled as one virtual network group, and bandwidth control can be performed for each virtual network group. For example, when a plurality of virtual networks is employed for the same type of works, these virtual networks can be considered as one virtual network group for the purpose of bandwidth control. In addition, even when the network includes plural VLANs, the switch does not need to have queues as many as the number of VLANs, whereby the configuration of the switch 10 can be simplified.

Further, by putting plural virtual networks which circulate the packets at different time zones into the same virtual network group, the resources (queues) can be effectively used.

Specifically, if there are a virtual network A in which packets circulate only in the morning and a virtual network B in which packets circulate only in the afternoon, the virtual networks A and B are taken as one virtual network group. With this, a predetermined queue can be used in the morning for relaying packets that circulate on the virtual network A, and the queue can be used in the afternoon for relaying packets that circulate on the virtual network B. As a result, the period during which the queues are not used can be reduced. Thus, the resources (queues) can be effectively used. Packets with different VLAN numbers can be stored in the same queue by changing various information stored in the queue-number storage unit 173 which will be explained later.

Figure 2:
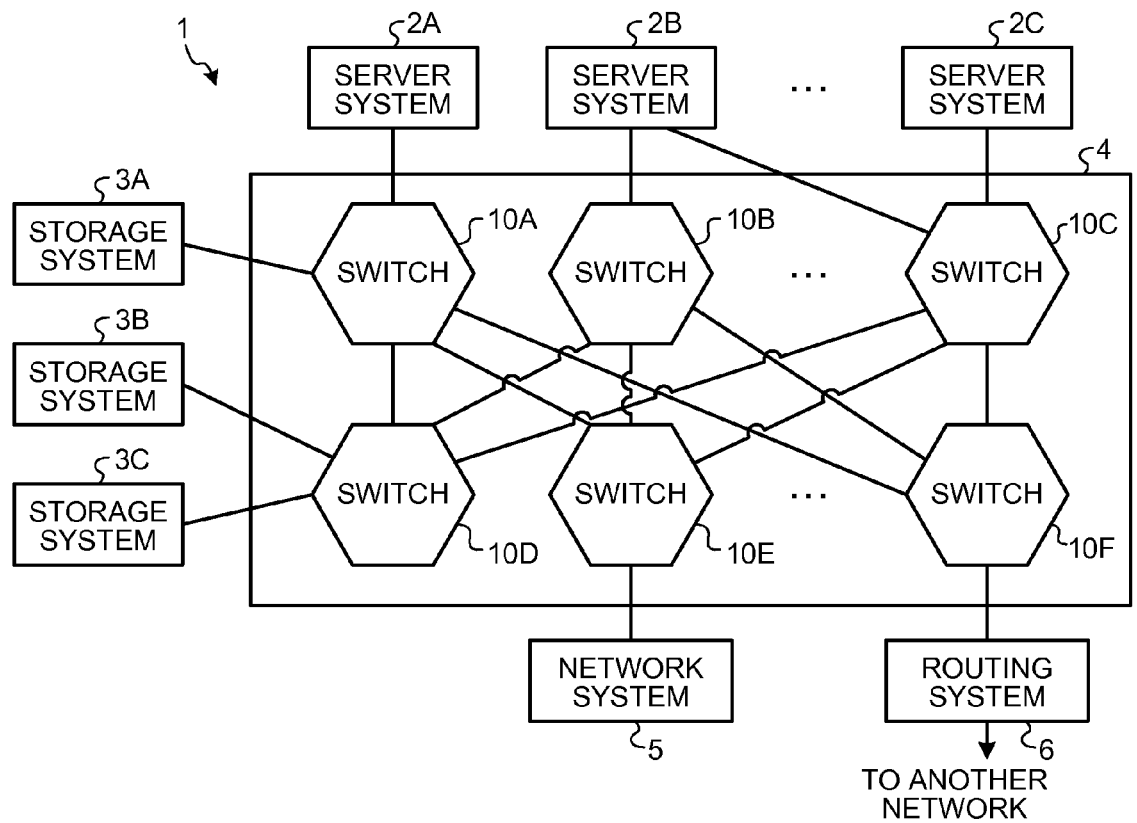
FIG. 2 is a drawing of an example of configuration of a network to which the switch according to the first embodiment is applied.

Next, a network to which the switch 10 according to the first embodiment is applied is explained. FIG. 2 is a drawing of an example of configuration of a network to which the switch 10 according to the first embodiment is applied. As depicted in FIG. 2, a network 1 includes server systems 2A to 2C, storage systems 3A to 3C, a switch group 4 including switches 10A to 10F, a network system 5, and a routing system 6. It is assumed that a plurality of virtual networks (VLANs) is formed in the network 1.

The server systems 2A to 2C are information processing apparatuses, such as host computers, and are connected to any one or more of the switches 10A to 10F. The storage systems 3A to 3C are data input and output apparatuses, such as storage apparatuses, and are connected to any of the switches 10A to 10F. The network system 5 is an apparatus for maintenance and monitoring of the network 1, and is connected to the switch 10E. The routing system 6 is an apparatus for relaying data between the network 1 and other network, and is connected to the switch 10F.

The switches 10A to 10F are relaying apparatuses for data relaying process, and are each connected to any one or more of the switches 10A to 10F other than itself and to any one or more of the server systems 2A to 2C, for example. In the network 1 in which virtual networks are formed, the switches 10A to 10F perform a relaying process by inserting or deleting a VLAN tag in or from a packet.

Note that the configuration of the network 1 depicted in FIG. 2 is merely an example, and the configuration example of the network to which the switches 10A to 10F according to the first embodiment are applied is not restricted to the one depicted in FIG. 2. For example, in the network 1 of FIG. 2, three server systems 2A to 2C, three storage systems 3A to 3C, six switches 10A to 10F, one network system 5, and one routing system 6 are provided. However, each number of components is not restricted to this example.

Figure 3:
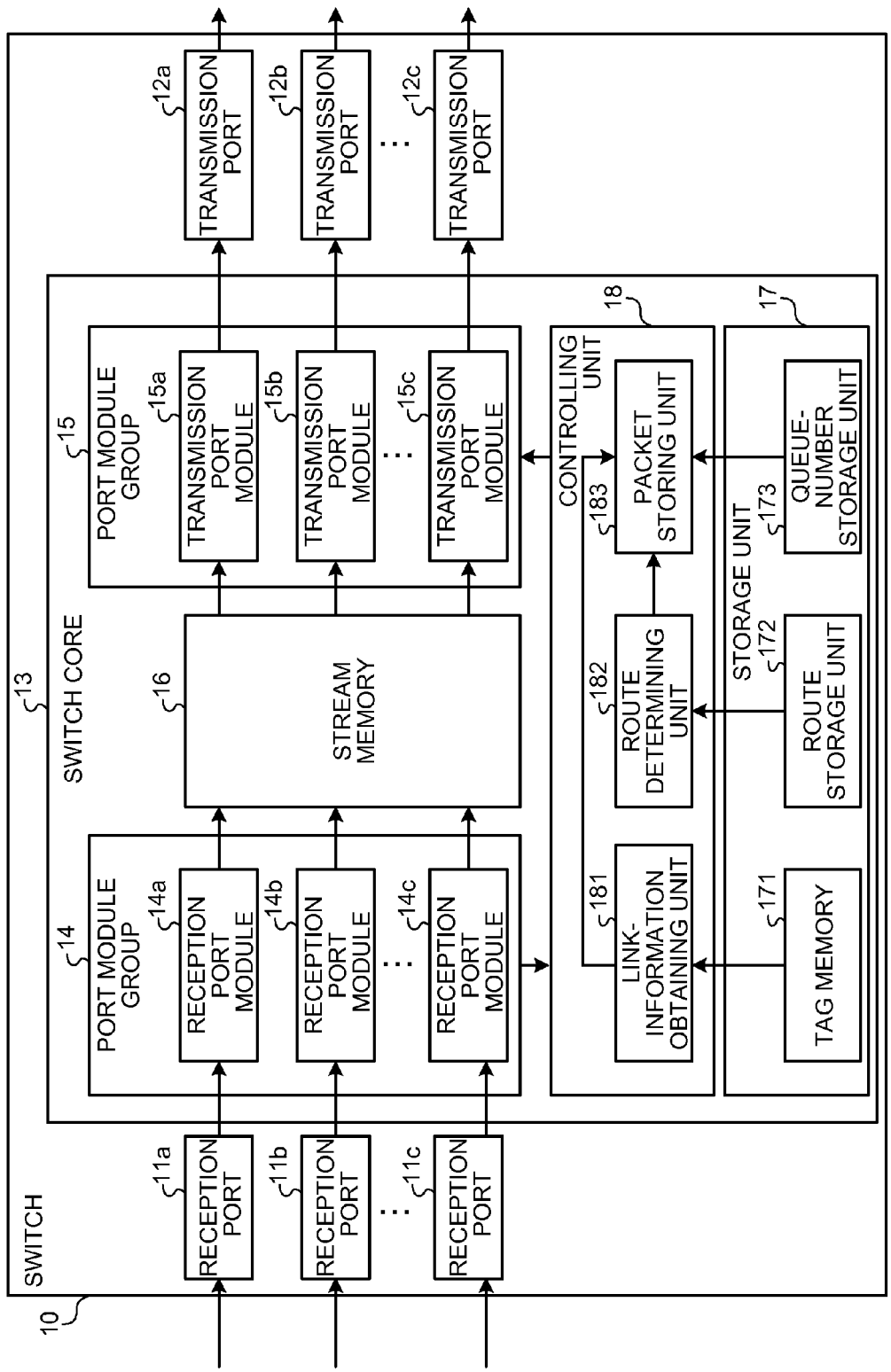
FIG. 3 is a block diagram of a configuration of the switch according to the first embodiment.

Next, the configuration of the switch 10 according to the first embodiment is explained. FIG. 3 is a block diagram of the configuration of the switch 10 according to the first embodiment. Note that the switch 10 depicted in FIG. 3 corresponds to each of the switches 10A to 10F depicted in FIG. 2. As depicted in FIG. 3, the switch 10 includes reception ports 11a to 11c, transmission ports 12a to 12c, and a switch core 13.

The reception ports 11a to 11c are interfaces that receive a packet from a predetermined apparatus (for example, any of the server systems 2A to 2C or another switch). Each of the reception ports 11a to 11c receives a packet from an apparatus belonging to a predetermined virtual network. For example, the reception port 11a receives a packet only from an apparatus belonging to any of virtual networks A to E, whereas the reception port 11b receives a packet only from an apparatus belonging to any of virtual networks F to J.

The transmission ports 12a to 12c are interfaces that transmit the packet received by the reception ports 11a to 11c to another apparatus. Each of the transmission ports 12a to 12c transmits a packet to an apparatus belonging to a predetermined virtual network. For example, the transmission port 12a transmits a packet only to an apparatus belonging to any of the virtual networks A to E, whereas the transmission port 12b transmits a packet only to an apparatus belonging to any of the virtual networks F to J.

In the example depicted in FIG. 3, the switch 10 includes three reception ports 11a to 11c and three transmission ports 12a to 12c. Alternatively, the switch 10 may include two or less reception ports and transmission ports, or four or more reception ports and transmission ports.

The switch core 13 is a functional unit for relaying data, and includes a port module group 14 including reception port modules 14a to 14c, a port module group 15 including transmission port modules 15a to 15c, the stream memory 16, a storage unit 17, and a controlling unit 18.

The reception port modules 14a to 14c are provided for the reception ports 11a to 11c, respectively, and, when a packet is input from the corresponding one of the reception ports 11a to 11c, write the packet in the stream memory 16 and output header information of the packet to the controlling unit 18. The "header information" herein represents, for example, Destination Address (DA: Destination Media Access Control (MAC) address) and Source Address (SA: transmission-source MAC address), VLAN number, and priority.

In the example of FIG. 3, the reception port module 14a corresponds to the reception port 11a, the reception port module 14b corresponds to the reception port 11b, and the reception port module 14c corresponds to the reception port 11c. Therefore, the reception port module 14a performs the process explained above on the packet received by the reception port 11a.

The transmission port modules 15a to 15c are provided for the transmission ports 12a to 12c, respectively, and output a packet stored in the stream memory 16 for output to the transmission ports 12a to 12c. Specifically, the transmission port modules 15a to 15c each have a plurality of queues for storing a relay instruction and, according to such a relay instruction, transmit a packet stored in the stream memory 16 to another apparatus via the transmission ports 12a to 12c. The configuration of the transmission port modules 15a to 15c will be explained in detail further below.

In the example of FIG. 3, the transmission port module 15a corresponds to the transmission port 12a, the transmission port module 15b corresponds to the transmission port 12b, and the transmission port module 15c corresponds to the transmission port 12c. Therefore, the transmission port module 15a outputs a packet to the transmission port 12a.

The stream memory 16 is a storage device, such as a memory, storing a packet written by any of the reception port modules 14a to 14c. The stream memory 16 has a storage area divided into logical blocks of a predetermined size to store data in units of logical block. For example, when the packet size is equal to or smaller than the size of one logical block, the stream memory 16 stores such a packet in one logical block. On the other hand, when the packet size is greater than the size of one logical block, the stream memory 16 stores such a packet as being divided into a plurality of logical blocks.

The storage unit 17 is a storage device, such as a memory, and includes a tag memory 171, a route storage unit 172, and the queue-number storage unit 173. The tag memory 171 stores various information for managing the logical blocks of the stream memory 16.

Specifically, the tag memory 171 stores logical block numbers for identifying the logical blocks. Also, the tag memory 171 stores information indicative of a relationship among the logical blocks (hereinafter, "link information"). Here, examples of the link information stored in the tag memory 171 are explained. For example, assume that one packet P101 is stored as being divided into three logical blocks R1 to R3. In this case, the tag memory 171 stores link information indicating that the packet P101 is stored in the logical blocks R1 to R3. Also, for example, assume that one data is divided into nine packets P201 to P209 and these packets P201 to P209 are stored in a plurality of logical blocks R11 to R30. In this case, the tag memory 171 stores link information indicating that the packets P201 to P209 are stored in the logical blocks R11 to R30.

Figure 4:
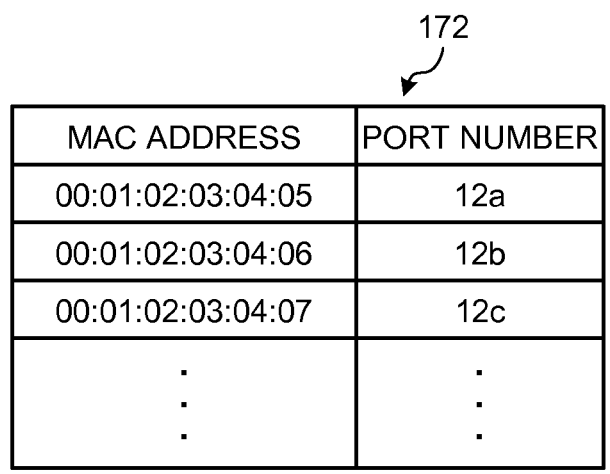
FIG. 4 is a drawing of an example of a route storage unit.

The route storage unit 172 stores, in association with the DA set for the packet, a number for identifying an output-destination transmission port for the packet (hereinafter, numbers for identifying the reception ports 11a to 11c and the transmission ports 12a to 12c are referred to as "port numbers"). An example of the route storage unit 172 is depicted in FIG. 4. As depicted in FIG. 4, the route storage unit 172 has items, such as MAC address and port number. The MAC address indicates a DA set for the packet. The port number indicates a port number of the corresponding output destination of the transmission ports 12a to 12c for the packet with its DA set with the corresponding MAC address. In the following, the reference numerals "11a" to "11c" provided to the reception ports 11a to 11c and "12a" to "12c" provided to the transmission ports 12a to 12c depicted in FIG. 3 are taken as port numbers.

The first row of the route storage unit 172 depicted in FIG. 4 indicates that a packet with its DA set with "00:01:02:03:04:05" is output to the transmission port 12a indicated by the port number "12a". The second row of the route storage unit 172 depicted in FIG. 4 indicates that a packet with its DA set with "00:01:02:03:04:06" is output to the transmission port 12b indicated by the port number "12b".

The queue-number storage unit 173 stores, for each priority in association with a VLAN number, a queue number (hereinafter, "Queue ID (QID)") for identifying a queue in which a relay instruction is to be stored. An example of the queue-number storage unit 173 is depicted in FIG. 5. As depicted in FIG. 5, the queue-number storage unit 173 has items, such as VLAN number, member port number, and QID.

The VLAN number indicates a number for identifying a virtual network. The member port number indicates a port number of any of the reception ports 11a to 11c that receives a packet distributed over the virtual network indicated by the VLAN number and any of the transmission ports 12a to 12c that transmits a packet over the virtual network indicated by the VLAN number. QID indicates a QID of the storage-destination queue of a relay instruction generated based on the packet set with the corresponding VLAN number and priority.

That is, the first row of the queue-number storage unit 173 depicted in FIG. 5 indicates that the reception port 11a is a port that receives a packet distributed over the virtual network indicated by a VLAN number "1" and that the transmission port 12a is a port that transmits the distributed packet. Further, the first row of the queue-number storage unit 173 depicted in FIG. 5 indicates that a relay instruction whose VLAN number is "1" and the priority is one of "0" to "7" is stored in a queue indicated by a QID "0".

The controlling unit 18 is a controlling unit for controlling the entire switch core 13, and includes a link-information obtaining unit 181, a route determining unit 182, and a packet storing unit 183. The link-information obtaining unit 181 is a processing unit that, when header information is input from the port module group 14, obtains from the tag memory 171 link information of a packet having this header information, and then outputs the obtained link information to the packet storing unit 183.

The route determining unit 182 is a processing unit that determines a transmission port to which the received packet is to be transmitted, based on various information stored in the route storage unit 172. Specifically, when header information is input from the port module group 14, the route determining unit 182 obtains from the route storage unit 172 a port number stored in association with the DA set for the header information. Then, the route determining unit 182 determines that the packet having this header information is to be output to any one of the transmission ports 12a to 12c that is indicated by the obtained port number.

For example, when the route storage unit 172 is in a state depicted in FIG. 4 and header information H1 having the DA set with "00:01:02:03:04:05" is input to the route determining unit 182 from the port module group 14, the route determining unit 182 obtains the port number "12a" from the route storage unit 172. The route determining unit 182 then determines that the packet having the header information H1 is to be output to the transmission port 12a indicated by the obtained port number "12a".

The packet storing unit 183 is a processing unit that generates a relay instruction, determines a storage-destination queue of the relay instruction based on various information stored in the queue-number storage unit 173, and stores the relay instruction in the determined queue.

Specifically, when header information is input from the port module group 14, the packet storing unit 183 generates a relay instruction including, for example, the input header information, a logical block number indicating a logical block on the stream memory 16 in which a packet having such header information is stored, and link information input from the link-information obtaining unit 181.

Subsequently, the packet storing unit 183 obtains from the queue-number storage unit 173 a QID stored in association with the combination of the VLAN number and the priority set in the header information. Subsequently, the packet storing unit 183 stores the relay instruction in a queue indicated by the QID obtained from the queue-number storage unit 173, from among the queues owned by one of the transmission port modules 15a to 15c corresponding to any one of the transmission ports 12a to 12c determined by the route determining unit 182.

For example, when the route storage unit 172 is in a state depicted in FIG. 4 and the queue-number storage unit 173 is in a state depicted in FIG. 5, and header information H2 set with a DA "00:01:02:03:04:06", a VLAN number "2", and a priority "7" is input to the controlling unit 18 from the port module group 14, the route determining unit 182 determines that the packet having the header information H2 is to be transmitted to the transmission port 12b. Subsequently, the packet storing unit 183 generates a relay instruction, and obtains a QID "1" stored in the queue-number storage unit 173 in association with a combination of a VLAN number "2" and a priority "7". Subsequently, the packet storing unit 183 stores the relay instruction in a queue with its QID "1" provided in association with the priority "7", from among the queues owned by the transmission port module 15b corresponding to the transmission port 12b determined by the route determining unit 182.

Figure 6:
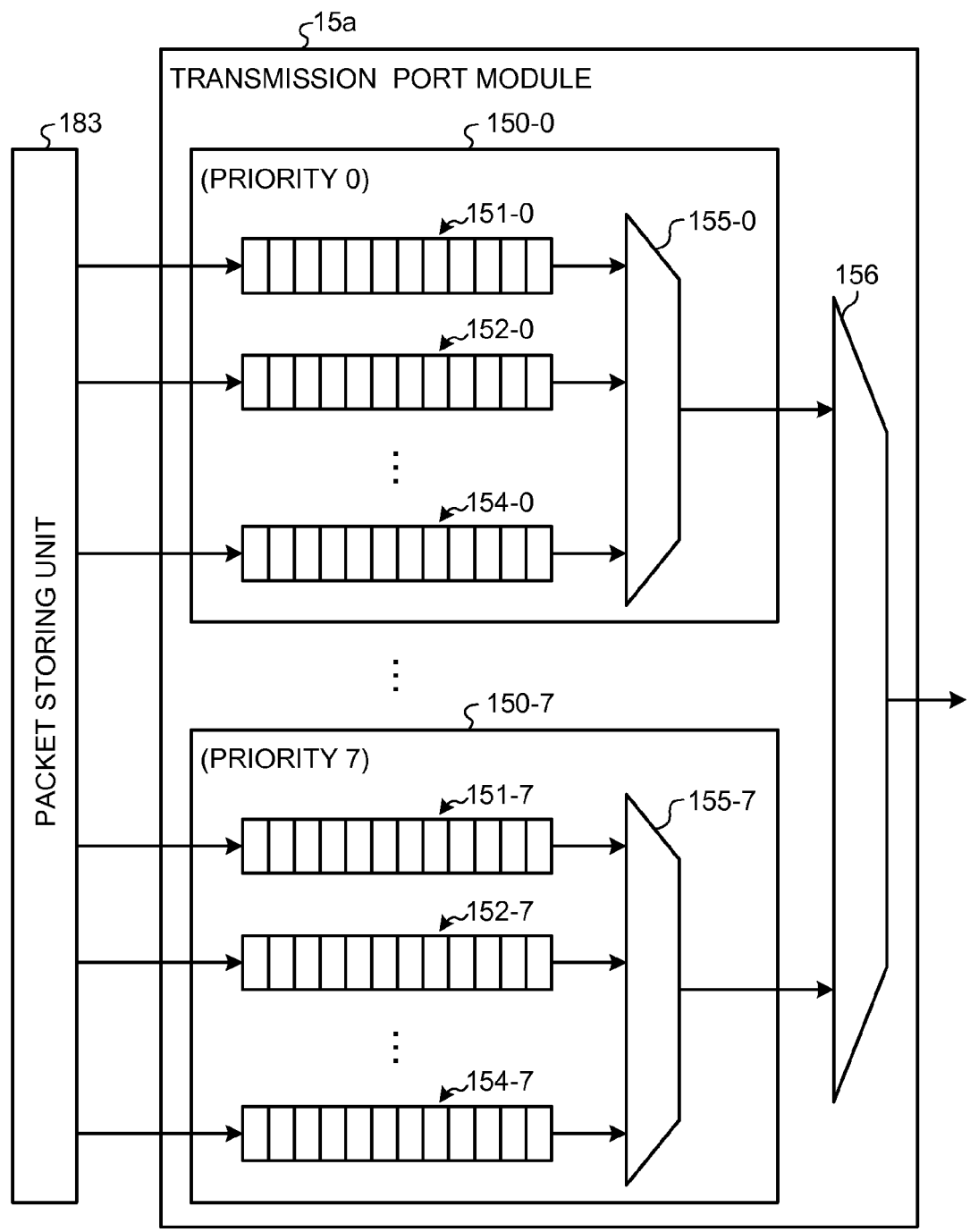
FIG. 6 is a block diagram of a configuration of a transmission port module depicted in FIG. 3.

Next, the configuration of the transmission port modules 15a to 15c depicted in FIG. 3 is explained. FIG. 6 is a block diagram of the configuration of one of the transmission port modules 15a to 15c depicted in FIG. 3. Since the transmission port modules 15a to 15c have the same configuration, only the configuration of the transmission port module 15a is explained.

As depicted in the FIG. 6, the transmission port module 15a has queue groups 150-0 to 150-7 and priority control transmission scheduler 156. The queue group 150-0 has queues 151-0 to 154-0 and a round-robin-control scheduler (DRR scheduler) 155-0. The queues 151-0 to 154-0 are storage areas in which a relay instruction with its priority "0" is stored by the packet storing unit 183. As explained above, the packet storing unit 183 determines any one of the queues 151-0 to 154-0 as a queue in which a relay instruction is to be stored based on the header information and the queue-number storage unit 173.

The DRR scheduler 155-0 is a processing unit that takes out a relay instruction from any of the queues 151-0 to 154-0 through a DRR technique. The DRR scheduler 155-0 may take out a relay instruction through a round robin technique with the same weighting ratio or a Weighted Round Robin (WRR) technique. Further, the DRR scheduler 155-0 may take out a relay instruction through a round robin technique disclosed in Japanese Patent Application Laid-open No. 2004-242335 applied by the applicant of the present application.

Similarly, the queue group 150-7 includes queues 151-7 to 154-7 in which a relay instruction with a priority "7" is stored by the packet storing unit 183 and a DRR scheduler 155-7. Although not depicted in FIG. 6, the transmission port module 15a also includes queue groups 150-1 to 150-6 in which relay instructions with priorities "1" to "6" are stored, respectively. The configuration of these queue groups 150-1 to 150-6 is similar to the configuration of the queue groups 150-0 and 150-7.

In the example depicted in FIG. 6, each of the queue groups 150-0 to 150-7 includes four queues (in the example of the queue group 150-0, the queues 151-0 to 154-0). Alternatively, each of the queue groups 150-0 to 150-7 may include three or less queues or five or more queues.

In the following, it is assumed that QIDs of each queue included in the queue group 150-0, for example, are "0", "1", "2", and "3" from the top. Specifically, it is assumed that the QID of the queue 151-0 is "0", the QID of the queue 152-0 is "1", the QID of the queue 153-0 is "2", and the QID of the queue 154-0 is "3". Similarly, it is assumed that the QID of the queue 151-7 is "0", the QID of the queue 152-7 is "1", the QID of the queue 153-7 is "2", and the QID of the queue 154-7 is "3". Note that the QID assigned to each queue is not restricted to the above, and a unique QID may be assigned to each queue.

The priority control transmission scheduler 156 processes the relay instructions taken out by the DRR schedulers 155-0 to 155-7 in the descending order of priority according to the respective relay instructions. Specifically, the priority control transmission scheduler 156 reads from the stream memory 16 a packet stored in a logical block indicated by the logical block number included in the relay instruction for output to the transmission port 12a. Further, when link information is included in the relay instruction, the priority control transmission scheduler 156 reads from the stream memory 16 a packet stored in a logical block indicated by the logical block number included in the link information for output to the transmission port 12a. The priority control transmission scheduler 156 performs a similar packet output process according to the relay instruction in the descending order of priority.

Figure 7:
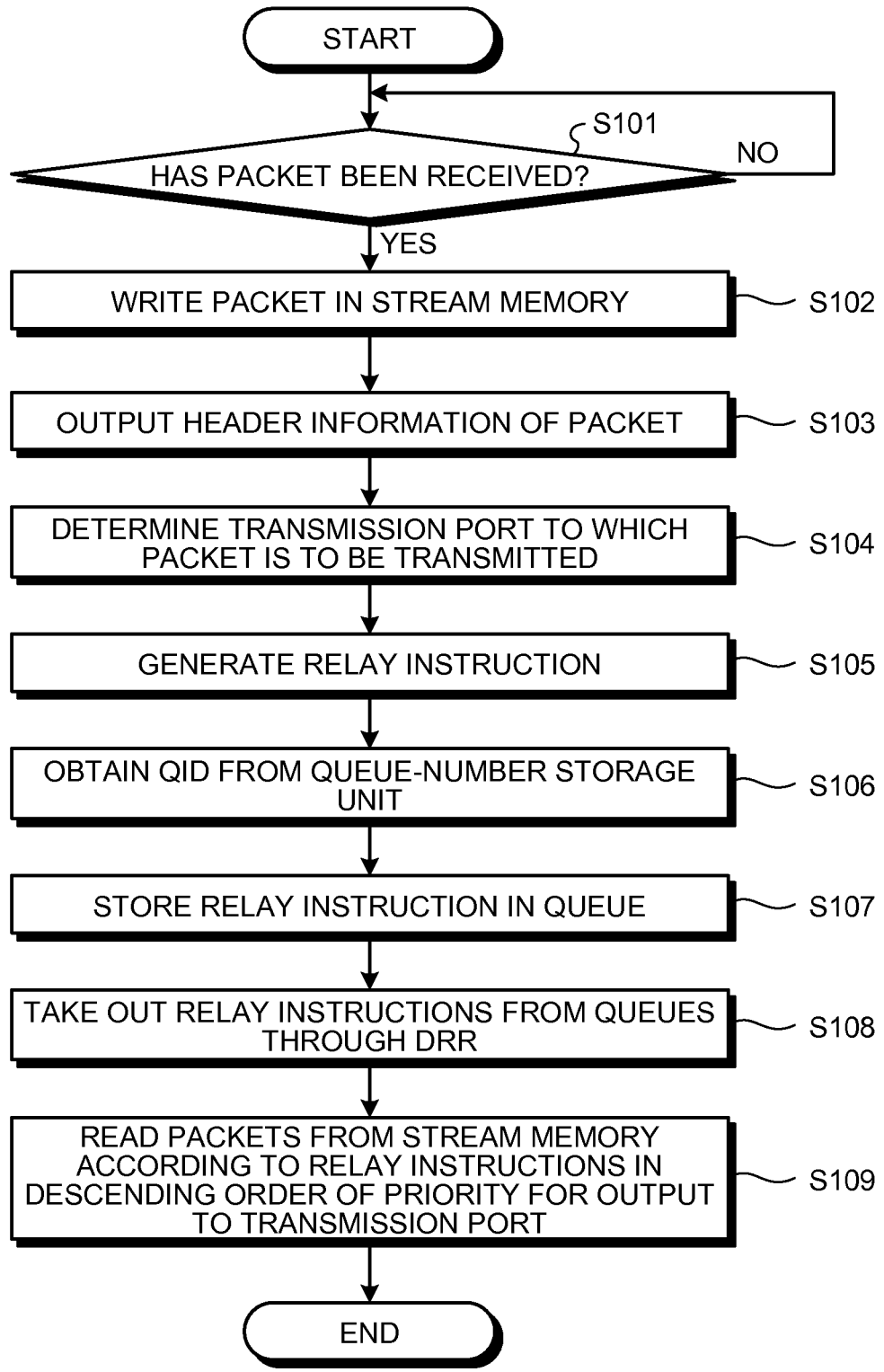
FIG. 7 is a flowchart of a packet relaying procedure performed by the switch according to the first embodiment.

Next, a packet relaying procedure performed by the switch 10 according to the first embodiment is explained. FIG. 7 is a flowchart of the packet relaying procedure performed by the switch 10 according to the first embodiment. As depicted in FIG. 7, when any of the reception ports 11a to 11c of the switch 10 receives a packet (Yes at Step S101), one of the reception port module 14a to 14c writes the packet in the stream memory 16 (Step S102). Further, the receiving one of the reception port modules 14a to 14c outputs header information of that packet to the controlling unit 18 (Step S103).

The route determining unit 182 of the controlling unit 18 accepting the header information determines a transmission port to which the packet is to be transmitted, based on the header information and various information stored in the route storage unit 172 (Step S104). Subsequently, the packet storing unit 183 generates a relay instruction including header information accepted from the relevant one of the reception port modules 14a to 14c, a logical block number indicative of a logical block in which the packet having the header information is stored, link information, and others (Step S105).

Subsequently, the packet storing unit 183 obtains a QID stored in the queue-number storage unit 173 in association with a combination of the VLAN number and the priority set for the header information (Step S106). Subsequently, the packet storing unit 183 stores the relay instruction in a queue that is provided in association with the priority set for that packet and is indicated by the QID obtained in step S106, from among the plurality of queues owned by the transmission port modules 15a to 15c corresponding to the transmission ports 12a to 12c determined by the route determining unit 182 (Step S107).

Subsequently, one of the DRR schedulers 155-0 to 155-7 of the transmission port modules 15a to 15c takes out relay instructions from the queues through the DRR technique (Step S108). Specifically, the DRR scheduler 155-0 takes out a relay instruction from any of the queues 151-0 to 154-0 through the DRR technique, whereas the DRR scheduler 155-7 takes out a relay instruction from any of the queues 151-7 to 154-7 through the DRR technique.

Subsequently, the priority control transmission scheduler 156 of the transmission port modules 15a to 15c obtains packets from the stream memory 16 according to the relay instructions in the descending order of priority from among the relay instructions taken out by the DRR schedulers 155-0 to 155-7, and then outputs these packets to any of the transmission ports 12a to 12c (Step S109). Specifically, the priority control transmission scheduler 156 obtains from the stream memory 16 a packet stored in the logical block indicated by the logical block number included in each relay instruction, and then outputs the packet to any of the transmission ports 12a to 12c. Also, when a relay instruction includes link information, the priority control transmission scheduler 156 reads from the stream memory 16 a packet stored in the logical block indicated by the logical block number included in the link information, and then outputs the packet to any of the transmission ports 12a to 12c.

As has been explained above, in the switch 10 according to the first embodiment, the packet storing unit 183 stores a relay instruction for the received packet in a queue varying depending on the priority and the VLAN number. The DRR schedulers 155-0 to 155-7 each take out a relay instruction from each queue through a DRR technique. The priority control transmission scheduler 156 transmits packets to another apparatus according to the relay instructions in a descending order of priority. With this, priority control can be performed in consideration of priorities for all received packets, and bandwidth control can be performed for each virtual network.

[b] Second Embodiment

In the first embodiment, an example of a switch, which performs a predetermined bandwidth control desired by the user over all virtual networks, is explained. However, some virtual network among the virtual networks may tolerate any bandwidth control. For example, in a predetermined network, the user may specify virtual networks A to E as virtual networks for which a predetermined bandwidth control is to be performed and may specify virtual networks F to J as virtual networks for which any bandwidth control may be allowed. In an example explained as a second embodiment, a switch performs bandwidth control desired by the user only on a predetermined virtual network among plural virtual networks.

Figure 8:
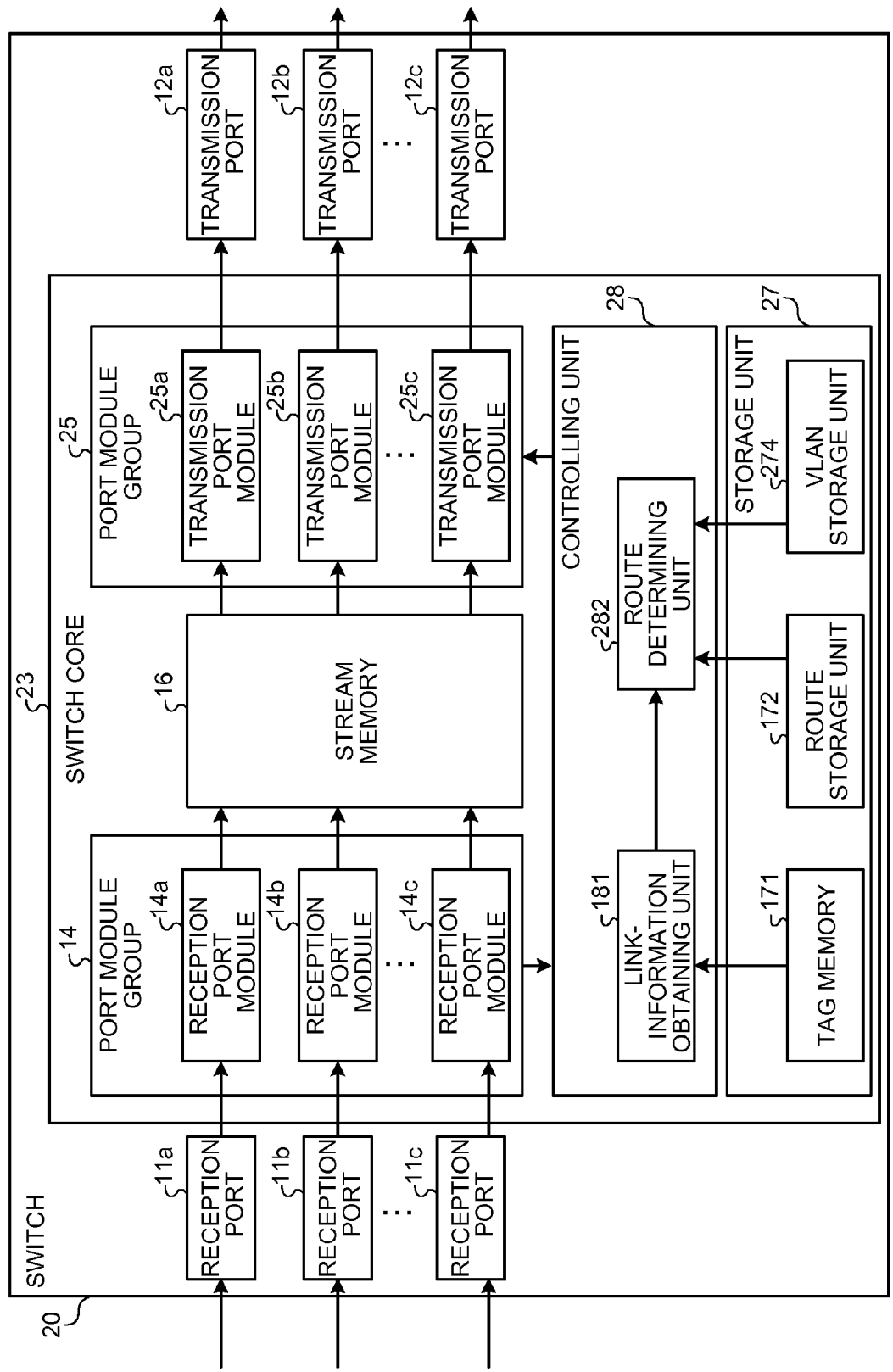
FIG. 8 is a drawing for explaining a general outline of a switch according to a second embodiment.

First, the configuration of a switch 20 according to the second embodiment is explained. FIG. 8 is a block diagram of the configuration of the switch 20 according to the second embodiment. In the following, components having functions similar to those of the components depicted in FIG. 3 are provided with the same reference numerals, and the description thereof will not be repeated.

As depicted in FIG. 8, the switch 20 includes a switch core 23, which includes a port module group 25, a storage unit 27, and a controlling unit 28 in place of the port module group 15, the storage unit 17, and the controlling unit 18 of the switch 13 depicted in FIG. 3.

The port module group 25 has transmission port modules 25a to 25c corresponding to the transmission ports 12a to 12c. The configuration of the transmission port modules 25a to 25c are explained further below in detail.

Figure 9:
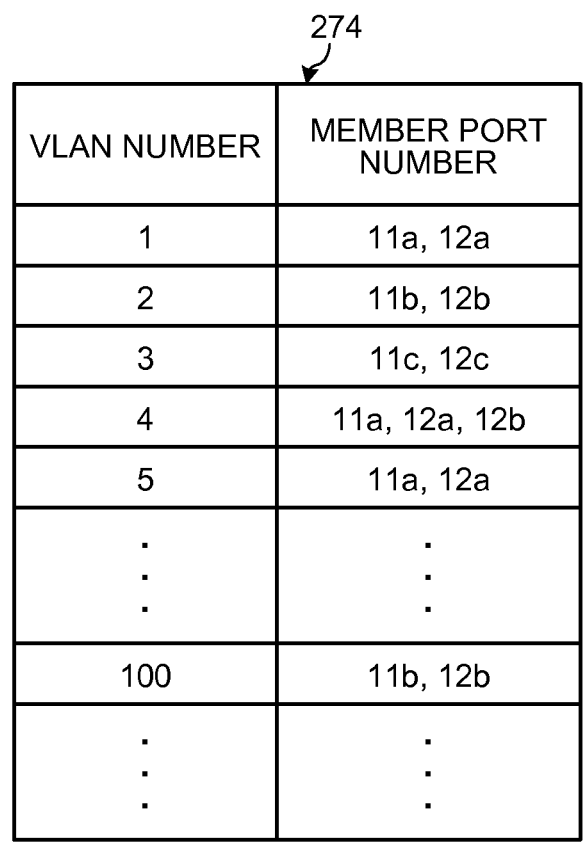
FIG. 9 is a drawing of an example of a VLAN storage unit.

The storage unit 27 has a VLAN storage unit 274 in place of the queue-number storage unit 173 of the storage unit 17 depicted in FIG. 3. An example of the VLAN storage unit 274 is depicted in FIG. 9. As depicted in FIG. 9, the VLAN storage unit 274 has items, such as VLAN number and member port number.

The controlling unit 28 has a route determining unit 282 in place of the route determining unit 182 and the packet storing unit 183 of the controlling unit 18 depicted in FIG. 3. Based on various information stored in the route storage unit 172, the route determining unit 282 determines a transmission port to which a packet is to be transmitted.

Further, when header information is input from the port module group 14, the route determining unit 282 generates a relay instruction including, for example, such header information, a logical block number indicating a logical block in which a packet having this header information is stored, and link information. Then, the route determining unit 282 outputs the generated relay instruction to one of the transmission port modules 25a to 25c corresponding to any one of the transmission ports 12a to 12c determined above. For example, when the transmission port 12a is determined as a transmission port to which the packet is to be transmitted, the route determining unit 282 outputs the relay instruction to the transmission port module 25a.

Figure 10:
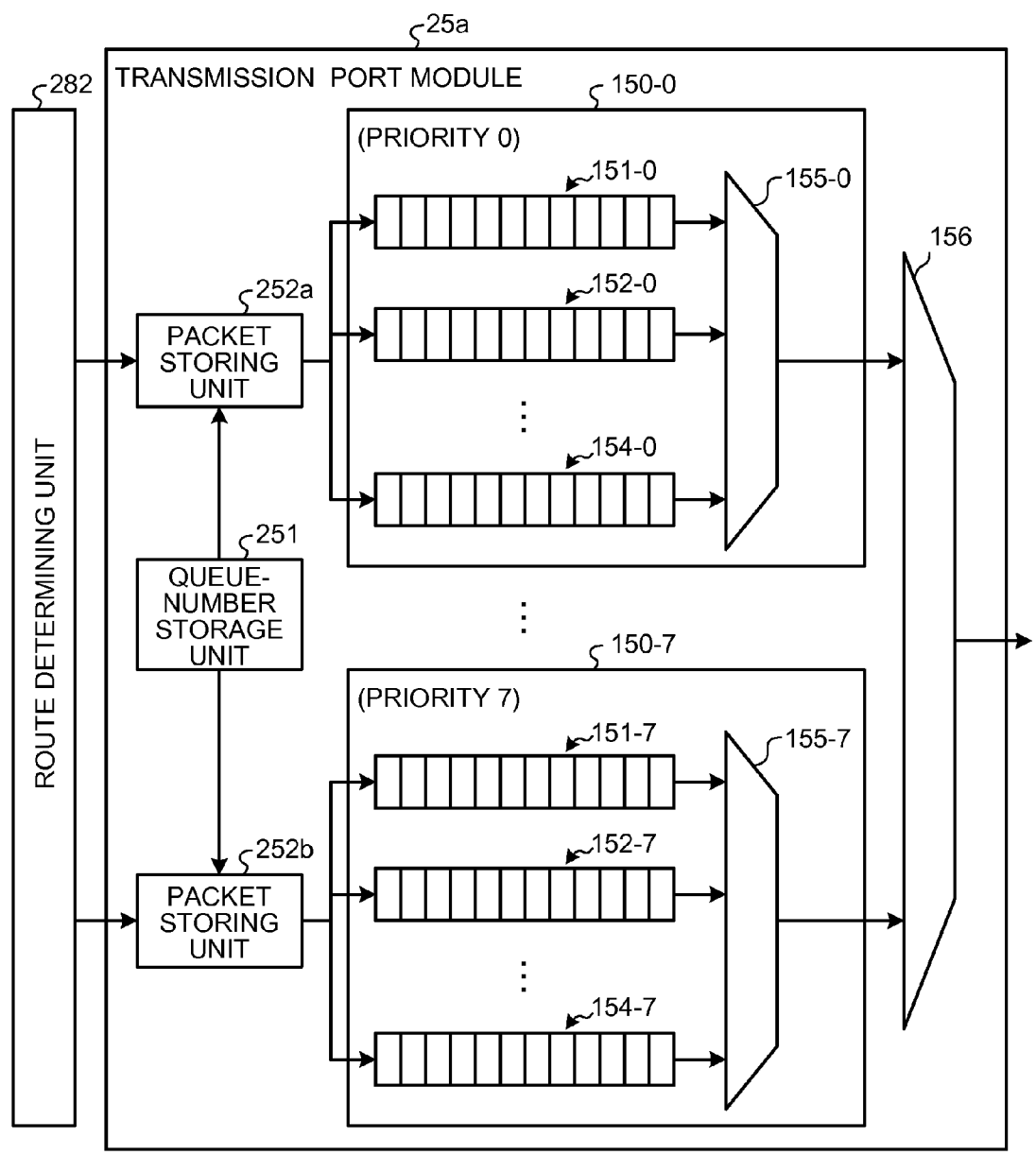
FIG. 10 is a block diagram of the configuration of a transmission port module depicted in FIG. 8.

Next, the configuration of the transmission port modules 25a to 25c depicted in FIG. 8 is explained. FIG. 10 is a block diagram of the configuration of one of the transmission port modules 25a to 25c depicted in FIG. 8. Because the transmission port modules 25a to 25c have the same configuration, only the configuration of the transmission port module 25a is explained. Further, in the following, components having functions similar to those of the components depicted in FIG. 6 are provided with the same reference numerals, and the description thereof will not be repeated.

As depicted in FIG. 10, the transmission port module 25a includes the queue groups 150-0 to 150-7, the priority control transmission scheduler 156, a queue-number storage unit 251, and packet storing units 252a and 252b.

The queue-number storage unit 251 stores a QID for each priority in association with a VLAN number. Further, when no queue is specified as a relay-instruction storage destination, the queue-number storage unit 251 stores, in a QID, information indicating that no queue is specified as a relay-instruction storage destination (hereinafter, "queue-unspecific information"). An example of the queue-number storage unit 251 is depicted in FIG. 11. As depicted in FIG. 11, the queue-number storage unit 251 has items, such as VLAN number and QID. In the example depicted in FIG. 11, set in a QID indicates queue-unspecific information.

That is, the second row of the queue-number storage unit 251 depicted in FIG. 11 indicates that a relay instruction with a VLAN number "2" can be stored in any queue. For example, a relay instruction with a VLAN number "2" and a priority "0" can by stored in any of the queues 151-0 to 154-0 depicted in FIG. 10.

Further, the third row of the queue-number storage unit 251 depicted in FIG. 11 indicates that a relay instruction with a VLAN number "3" and a priority of any one of "0" to "3" can be stored in any queue and a relay instruction with the VLAN number "3" and a priority of any one of "4" to "7" can be stored in a queue with a QID "2".

The packet storing units 252a and 252b are processing units that each perform a QID determining process in which a QID of a queue in which a relay instruction is to be stored based on various information stored in the queue-number storage unit 251 and store the relay instruction input from the route determining unit 282 in the queue indicated by the determined QID.

Figure 12:
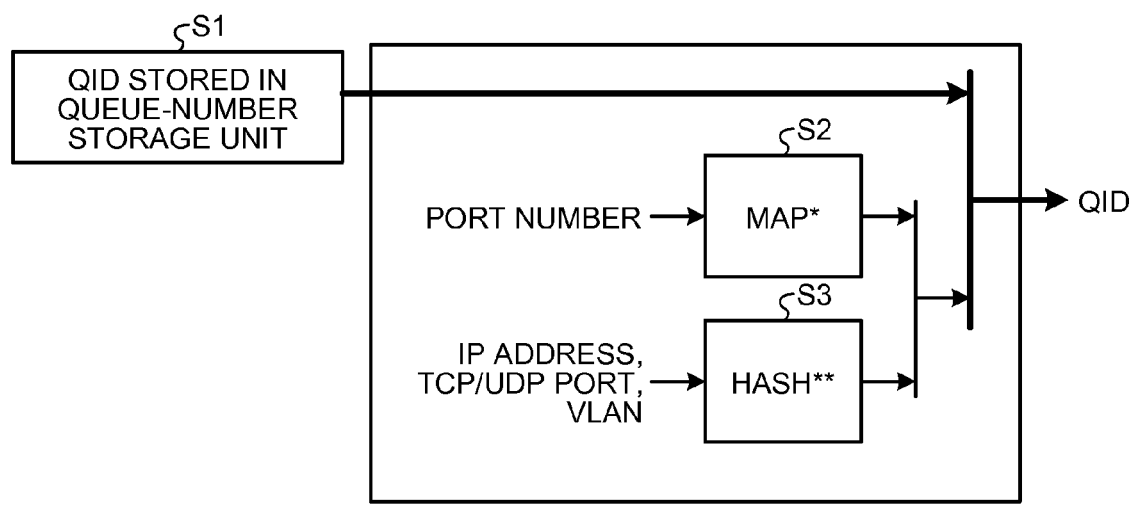
FIG. 12 is a drawing for explaining a QID determining process with a packet storing unit depicted in FIG. 10.

Here, a QID determining process by the packet storing unit 252a depicted in FIG. 10 is specifically explained by using FIG. 12. FIG. 12 is a drawing for explaining a QID determining process performed by the packet storing unit 252a depicted in FIG. 10. When a relay instruction with a priority "0" is input, the packet storing unit 252a obtains from the queue-number storage unit 251 a QID stored in association with a combination of a VLAN number and a priority "0" included in the relay instruction. When the obtained QID does not indicate queue-unspecific information, the packet storing unit 252a determines this QID as a QID in which the relay instruction is to be stored (Step S1).

On the other hand, when the obtained QID indicates queue-unspecific information, the packet storing unit 252a calculates an unspecific QID. Specifically, the packet storing unit 252a calculates a Map value of a port number indicating any one of the reception ports 11a to 11c receiving the packet (Step S2). For example, the packet storing unit 252a calculates lower two bits of the port number as a Map value.

Further, the packet storing unit 252a calculates a hash value by using the header information of the packet (Step S3). For example, the packet storing unit 252a calculates Cyclic Redundancy Checking (CRC-8) code for every eight bits from the head of an Internet Protocol (IP) address, a Transmission Control Protocol (TCP)/User Datagram Protocol (UDP) port number, and the VLAN number, and then calculates exclusive-OR of these plurality of calculated CRC codes as a hash value.

Subsequently, the packet storing unit 252a determines either one of the Map value and the hash value as a QID of the queue in which the relay instruction is to be stored. The packet storing unit 252a then stores the relay instruction in the queue indicated by thus determined QID. Although the technique of determining an unspecific QID by using the Map value or the hash value is explained above, this technique is merely an example. Alternatively, the packet storing unit 252a may determine a QID by using another technique. For example, the packet storing unit 252a may sequentially change the storage-destination queue every time a relay instruction is stored in the queue.

The packet storing unit 252b is a processing unit that performs a process similar to that of the packet storing unit 252a. When a relay instruction with a priority "7" is input, the packet storing unit 252b generates a relay instruction, and stores the relay instruction in any of the queues 151-7 to 154-7 based on the various information stored in the queue-number storage unit 251.

Thus, a relay instruction for a circulating packet on a virtual network for any bandwidth control is stored in an unspecific queue. Thus, the switch 20 can use the queues evenly. As a result, the resources (queues) can be effectively used.

Figure 13:
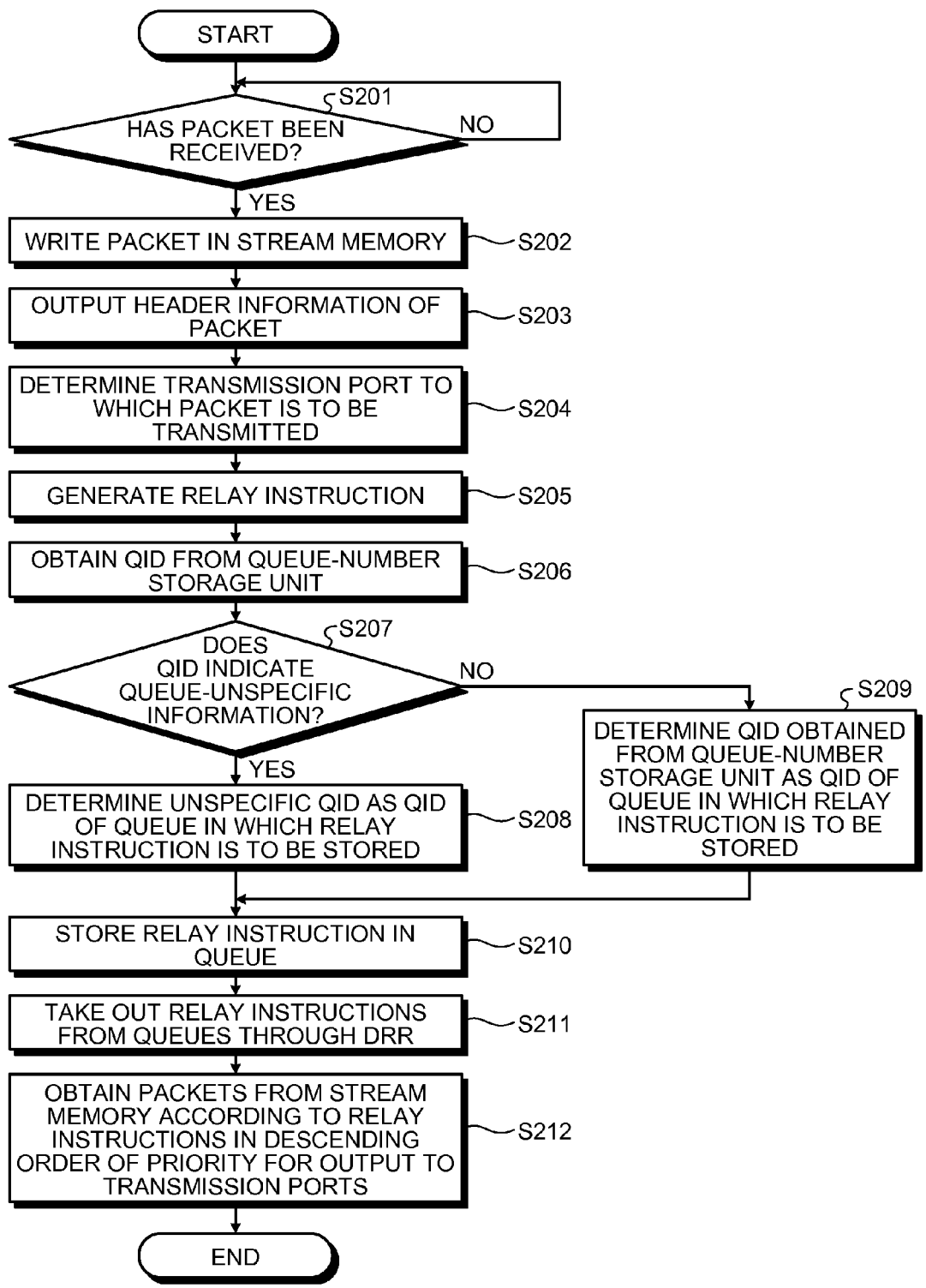
FIG. 13 is a flowchart of a packet relaying procedure performed by the switch according to the second embodiment.

Next, a packet relaying procedure with the switch 20 according to the second embodiment is explained. FIG. 13 is a flowchart of a packet relaying procedure with the switch 20 according to the second embodiment. As depicted in FIG. 13, when any of the reception ports 11a to 11c of the switch 20 receives a packet ("Yes" at Step S201), the relevant one of the reception port modules 14a to 14c writes the packet in the stream memory 16 (Step S202). Further, the relevant one of the reception port modules 14a to 14c outputs header information of that packet to the controlling unit 28 (Step S203).

The route determining unit 282 of the controlling unit 28 accepting the header information determines a transmission port to which the packet is to be transmitted, based on the header information and various information stored in the route storage unit 172 (Step S204). Subsequently, the route determining unit 282 generates a relay instruction (Step S205), and then outputs the generated relay instruction to one of the transmission port modules 25a to 25c corresponding to any of the transmission ports 12a to 12c determined at Step S204.

The packet storing unit 252a or 252b of the relevant one of the transmission port modules 25a to 25c accepting the relay instruction obtains from the queue-number storage unit 251 a QID stored in association with a combination of the VLAN number and the priority included in the relay instruction (Step S206).

When the obtained QID indicates queue-unspecific information ("Yes" at Step S207), the packet storing unit 252a or 252b determines an unspecific QID as a QID of a queue in which the relay instruction is to be stored (Step S208). For example, the packet storing unit 252a or 252b calculates a Map value or a hash value in a manner as explained above, and then determines the calculated value as a QID of a queue in which the relay instruction is to be stored.

On the other hand, when the obtained QID does not indicate queue-unspecific information ("No" at Step S207), the packet storing unit 252a or 252b determines the QID obtained from the queue-number storage unit 251 as a QID of a queue in which the relay instruction is to be stored (Step S209). Subsequently, the packet storing unit 252a or 252b stores the relay instruction in the queue indicated by the QID determined at Step S208 or S209 (Step S210).

Subsequently, the DRR schedulers 155-0 to 155-7 of the transmission port modules 25a to 25c take out relay instructions from the respective queues through a DRR technique (Step S211). Subsequently, the priority control transmission scheduler 156 obtains packets from the stream memory 16 according to the relay instructions among the relay instructions taken out by the DRR schedulers 155-0 to 155-7 in a descending order of priority, and then outputs these packets to the transmission ports 12a to 12c (Step S212).

As has been explained above, in the switch 20 according to the second embodiment, the queue-number storage unit 251 has stored therein a QID or queue-unspecific information for each priority in association with the VLAN number and, when queue-unspecific information is stored, the packet storing unit 252a or 252b determines that any bandwidth control can be performed and stores the relay instruction in an unspecific queue. Therefore, as for a virtual network specified by the user for a predetermined bandwidth control, the user-desired bandwidth control can be performed for each virtual network or virtual network group. Furthermore, the resources (queues) can be effectively used.

Further, the queue-number storage unit 251 can set queue-unspecific information not only for each VLAN number but also for each priority. Therefore, the user can set a specification such that any bandwidth control can be performed for each priority. This is specifically explained below by using the example depicted in FIG. 11. As in the second row of the queue-number storage unit 251 depicted in FIG. 11, the user can set a specification such that any bandwidth control can be performed in units of virtual network. Furthermore, as depicted in the third row of the queue-number storage unit 251 depicted in FIG. 11, the user can set a specification such that any bandwidth control can be performed in units of priority.

In the first to second embodiments, an example is explained in which the packet storing unit 183, for example, stores a relay instruction in a queue, and the transmission port module 15a, for example, takes out the relay instruction from the queue, and then a packet relaying process is performed according to the relay instruction. Such a packet relaying technique is merely an example, and a packet relaying process may be performed through another technique. For example, as explained by using FIG. 1, the switches 10, 20, and 30 may store packets themselves in each queue for packet relaying.

Further, the process procedure, the control procedure, specific names, and information including various data and parameters can be arbitrarily changed unless otherwise specified. Furthermore, each component depicted is conceptual in function, and is not necessarily physically configured as depicted. That is, the specific patterns of distribution and unification of the components are not meant to be restricted to those depicted in the drawings. All or part of the components can be functionally or physically distributed or unified in arbitrary units according to various loads and the state of use. Still further, all or arbitrary part of the process functions performed in each component can be achieved by a Central Processing Unit (CPU) and a program analyzed and executed on that CPU, or can be achieved as hardware with a wired logic.

According to the embodiments, an effect can be achieved such that priority control can be performed taking priority of all received packets into consideration, and also bandwidth control can be performed for each virtual network.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relaying apparatus comprising:
a plurality of reception ports each receiving a packet from an apparatus belonging to a predetermined virtual network;
a plurality of transmission ports;
a memory that stores therein first association of a transmission port from among the transmission ports with destination information set in a packet, and second association of a plurality of queues with a combination of a plurality of VLAN numbers handled as one virtual network group and a predetermined priority for each priority, a queue having a queue ID for identification indicated by a Map value of a port number indicating a reception port of the packet; and
a controller that specifies a transmission port that corresponds to destination information set in a packet received by one of the reception ports, by referring to the first association stored in the memory,
registers the packet in any of a plurality of queues corresponding to the transmission port specified by the memory when queue-unspecific information is stored in the memory in association with a combination of a VLAN number and a priority set in a packet received,
registers the received packet in one of queues corresponding to the specified transmission port, the one of queues corresponding to the combination of the VLAN number and the priority set in the received packet and being specified by referring to the second association stored in the memory when queue-unspecific information is not stored in the memory in association with the combination of the VLAN number and the priority set in the packet received, and
controls, for one transmission port included in the transmission ports, selection of a queue from a plurality of queues associated with a same priority, for different priorities, and transmission, in order of the different priorities, of packets registered in the selected queues, the queue ID indicating the queue-unspecific information that indicates no queue is specified as a relay-instruction storage destination for performing bandwidth control by each VLAN when a predetermined symbol is set in the queue ID.

2. The relaying apparatus according to claim 1, wherein the controller includes
a round-robin controlling unit that takes out packets from a plurality of queues associated with a same priority through a round-robin technique and
a priority-control transmitting unit that transmits the packets taken out by the round-robin controlling unit to the other apparatus in a descending order of priority.

3. The relaying apparatus according to claim 2, wherein
the round-robin technique employed by the round-robin controlling unit is one of a Deficit Round Robin technique and a Weighted Round Robin technique.

4. The relaying apparatus according to claim 1, wherein
the queue having the queue ID for identifying the queue identical to the queue ID indicated by a hash value of header information of the packet.

5. The relaying apparatus according to claim 1, wherein when the queue-unspecific information is set for a packet, the memory can register the packet in a queue corresponding to any priorities.

6. A packet relaying method for relaying a packet transmitted from an apparatus belonging to a predetermined virtual network to another apparatus via plural reception ports receiving a packet and plural transmission ports transmitting a packet, the method comprising:
specifying a transmission port that corresponds to destination information set in a packet received by one of the reception ports, by referring to a memory that stores first association of a transmission port from among the transmission ports with destination information set in a packet, and second association of a plurality of queues with a combination of a plurality of VLAN numbers handled as one virtual network group and a predetermined priority for each priority, a queue having a queue ID for identification indicated by a Map value of a port number indicating a reception port of the packet;
registering the packet in any of a plurality of queues corresponding to the transmission port specified by the memory when queue-unspecific information is stored in the memory in association with a combination of a VLAN number and a priority set in a packet received;
registering the received packet in one of queues corresponding to the transmission port specified in the specifying, the one of queues corresponding to the combination of the VLAN number and the priority set in the received packet and being specified by referring to the memory when queue-unspecific information is not stored in the memory in association with the combination of the VLAN number and the priority set in the packet received; and
controlling, for one transmission port included in the transmission ports, selection of a queue from a plurality of queues associated with a same priority, for different priorities, and transmission, in order of the different priorities, of packets registered in the selected queues, the queue ID indicating the queue-unspecific information that indicates no queue is specified as a relay-instruction storage destination for performing bandwidth control by each VLAN when a predetermined symbol is set in the queue ID.

* * * * *